United States Patent
Barac et al.

(10) Patent No.: US 12,063,518 B2
(45) Date of Patent: Aug. 13, 2024

(54) MANAGEMENT OF RESOURCE ALLOCATION AND NOTIFICATION CONTROL OVER RAN INTERFACES

(71) Applicant: Telefonaktiebolaget LM Ericsson (publ), Stockholm (SE)

(72) Inventors: Filip Barac, Huddinge (SE); Angelo Centonza, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/960,630

(22) PCT Filed: Jan. 22, 2019

(86) PCT No.: PCT/IB2019/050542
§ 371 (c)(1),
(2) Date: Jul. 8, 2020

(87) PCT Pub. No.: WO2019/142175
PCT Pub. Date: Jul. 25, 2019

(65) Prior Publication Data
US 2020/0367064 A1 Nov. 19, 2020

Related U.S. Application Data

(60) Provisional application No. 62/620,197, filed on Jan. 22, 2018.

(51) Int. Cl.
*H04W 16/14* (2009.01)
*H04L 5/00* (2006.01)
(Continued)

(52) U.S. Cl.
CPC ........... *H04W 16/14* (2013.01); *H04L 5/0051* (2013.01); *H04W 72/0453* (2013.01); *H04W 72/53* (2023.01)

(58) Field of Classification Search
CPC ............ H04W 16/14; H04W 72/0453; H04W 72/0493; H04W 16/10; H04W 72/0433; H04L 5/0051
See application file for complete search history.

(56) References Cited

U.S. PATENT DOCUMENTS

2009/0268680 A1* 10/2009 Nam ............... H04W 64/00 370/329
2013/0090124 A1* 4/2013 Panchal ........... H04W 24/02 455/452.1
(Continued)

FOREIGN PATENT DOCUMENTS

CN 106605440 A 4/2017
EP 3 229 514 A1 10/2017
(Continued)

OTHER PUBLICATIONS

PCT International Search Report issued for International application No. PCT/IB2019/050542—May 14, 2019.
(Continued)

*Primary Examiner* — Thai Nguyen
(74) *Attorney, Agent, or Firm* — Baker Botts L.L.P.

(57) ABSTRACT

According to certain embodiments, a method is provided for resource allocation between a first network node (160) associated with a first radio access technology (RAT) and a second network node (160) associated with a second RAT where the first RAT and the second RAT use an overlapping spectrum. The method includes determining, by the first network node, one or more resources of a plurality of resources for use by the second network node. The plurality of resources is represented by a bit string. A message is transmitted to the second network node. The message includes the bit string in which the one or more resources for use by the second network node are indicated.

28 Claims, 11 Drawing Sheets

(51) Int. Cl.
*H04W 72/0453* (2023.01)
*H04W 72/53* (2023.01)

(56) References Cited

U.S. PATENT DOCUMENTS

| | | | | |
|---|---|---|---|---|
| 2013/0188566 A1* | 7/2013 | Zhu | ................. | H04L 5/0037 |
| | | | | 370/329 |
| 2013/0196677 A1 | 8/2013 | Smith et al. | | |
| 2014/0308968 A1* | 10/2014 | Xiao | ................. | H04W 16/14 |
| | | | | 455/452.1 |
| 2016/0270034 A1* | 9/2016 | Chai | ................. | H04W 16/10 |
| 2017/0064692 A1* | 3/2017 | Kahtava | ................. | H04L 5/0044 |
| 2019/0191456 A1* | 6/2019 | Koorapaty | ................. | H04W 72/0446 |

FOREIGN PATENT DOCUMENTS

| | | | |
|---|---|---|---|
| RU | 2 620 717 C2 | 5/2015 | |
| TW | 201735555 A | 10/2017 | |
| WO | WO-2014105566 A1 * | 7/2014 | ............ H04W 16/14 |
| WO | 2015 048756 A1 | 4/2015 | |
| WO | 2017 146987 A1 | 8/2017 | |
| WO | 2017173133 A1 | 10/2017 | |

OTHER PUBLICATIONS

PCT Written Opinion of the International Searching Authority for International application No. PCT/IB2019/050542—May 14, 2019.
Russian Office Action issued for Application No. 2020127840/07—Dec. 4, 2020.
Japanese Office Action issued for Application No. 2020-537725—Nov. 12, 2021.
3GPP TSG-RAN WG1 Meeting #90; Prague, Czech Republic; Source: NEC; Title: Views on UL sharing of NR and LTE (R1-1714054)—Aug. 21-25, 2017.
3GPP TSG RAN WG3 NR AdHoc 1801; Sophia Antipolis, France; Source: Ericsson; Title: LTE-NR radio resource allocation coordination (R3-180435)—Jan. 22-26, 2018.
Official Communication issued for Chinese Application No. 201980009483.2—Jan. 6, 2023.
Notification of Registration Procedures issued for Application number or patent No. 201980009483.2—Jun. 7, 2023.

* cited by examiner

MANAGEMENT OF RESOURCE ALLOCATION AND NOTIFICATION CONTROL OVER RAN INTERFACES

PRIORITY

This nonprovisional application is a U.S. National Stage Filing under 35 U.S.C. § 371 of International Patent Application Serial No. PCT/IB2019/050542 filed Jan. 22, 2019 and entitled "MANAGEMENT OF RESOURCE ALLOCATION AND NOTIFICATION CONTROL OVER RAN INTERFACES" which claims priority to U.S. Provisional Patent Application No. 62/620,197 filed Jan. 22, 2018 both of which are hereby incorporated by reference in their entirety.

BACKGROUND

Generally, all terms used herein are to be interpreted according to their ordinary meaning in the relevant technical field, unless a different meaning is clearly given and/or is implied from the text in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates the current 5G radio access network (RAN) architecture, which is described in TS 38.401. The next generation (NG) architecture can be further described as follows:

- The NG-RAN consists of a set of next generation NodeBs (gNBs) connected to the 5G Core network (5GC) through the NG.
- An gNB can support frequency division duplex (FDD) mode, time division duplex (TDD) mode or dual mode operation.
- gNBs can be interconnected through the Xn interface.
- A gNB may consist of a gNB-central unit (gNB-CU) and gNB-distributed units (gNB-Dus).
- A gNB-CU and a gNB-DU are connected via F1 logical interface.
- One gNB-DU is connected to only one gNB-CU.
- NG, Xn and F1 are logical interfaces. For NG-RAN, the NG and Xn-C interfaces for a gNB consisting of a gNB-CU and gNB-DUs, terminate in the gNB-CU. For EN-DC, the S 1-U and X2-C interfaces for a gNB consisting of a gNB-CU and gNB-DUs, terminate in the gNB-CU. The gNB-CU and connected gNB-DUs are only visible to other gNBs and the 5GC as a gNB.
- The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1), the related TNL protocol and the functionality are specified. The TNL provides services for user plane transport and signaling transport. In NG-Flex configuration, each gNB is connected to all Access and Mobility Management Functions (AMFs) within an AMF Region. The AMF Region is defined in 3GPP TS 23.501.

In future deployments, base stations of two different radio access technologies (RATs) may be deployed in shared spectrum scenarios i.e. over (fully or partially) overlapping frequency bands. In this setup, the coverage areas of the two base stations (i.e. RATs) may fully or partially overlap. An important aspect to be considered in multi-RAT resource sharing is the existence of a number of always-on reference and control signals. In addition, there may exist reference and control signals that are not always-on, but should be occasionally transmitted in order to secure efficient network operation. The transmission of these signals may, in turn, overlap parts of the time-frequency resource grid that are not currently assigned to their corresponding RAT in the spectrum sharing scenario. As described herein, the two aforementioned types of signals shall be denoted as overlapping control and reference signals (OCRS).

The physical layer transmission in Long-Term Evolution (LTE) and New Radio (NR) uses orthogonal frequency-division multiplexing (OFDM) in the downlink, and while LTE always uses discrete Fourier transform-spread (DFT-spread) OFDM in the uplink, it can for NR be configurable to either OFDM or DFT-spread OFDM. FIG. 2 illustrates the basic LTE and NR physical resource structure as a time-frequency grid where each resource element corresponds to one subcarrier during one OFDM symbol interval. The LTE downlink physical resource subcarrier spacing is 15 kHz.

In the time domain, LTE downlink transmissions are organized into radio frames of 10 ms, each radio frame consisting of ten equally-sized subframes of 1 ms. A subframe is divided into two slots, and each is of a 0.5 ms time duration. FIG. 3 illustrates the LTE time domain structure.

The resource allocation in LTE is described in terms of resource blocks (RB), where a RB corresponds to one slot in the time domain and 12 contiguous 15 kHz subcarriers in the frequency domain. Two in time consecutive RBs represent an RB pair or PRB and correspond to the time interval upon which scheduling operates.

In the time domain, NR downlink transmissions are organized into radio frames of 10 ms, each radio frame consisting of ten equally-sized subframes of 1 ms. A subframe is divided into 1, 2, 4, 8 or 16 slots, each of a configurable time duration. FIG. 4 illustrates the NR time domain structure.

The resource allocation in NR is described in terms of resource blocks (RB), where a RB corresponds to one slot in the time domain and 12 contiguous subcarriers in the frequency domain where the subcarrier bandwidth is configurable, see below.

In NR, the bandwidth for which a user equipment (UE) is served can be UE-specific, so two UEs which have capabilities to receive different maximum bandwidths can still be served by the same carrier band. The term bandwidth part (BWP) is introduced, which is the part of the bandwidth where the UE currently is served. For example, the carrier can have 100 MHz bandwidth, but a less complex UE can only operate on a 15 MHz BWP while another UE can use the full 100 MHz BWP. It is also possible that a given UE is configured a narrow (e.g. 15 MHz) BWP and a wide (e.g. 100 MHz) BWP simultaneously, while only one of its configured BWPs is active at a time. This allows the UE to save battery when there is no need for large data transfer, but it can quickly switch to a large BWP if there is a need to transmit or receive a lot of data.

NR is based on an OFDM based waveform, but compared to LTE which uses a fixed subcarrier spacing of 15 kHz and 1 ms long subframes, a scaled numerology is introduced, where a parameter μ is used to set the subcarrier spacing $\Delta f = 2^\mu \cdot 15$ [kHz] for a given bandwidth part. Table 1 below shows the supported subcarrier spacings in NR Rel-14.

TABLE 1

Supported transmission numerologies and subcarrier spacing Δf

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

When the subcarrier spacing is increased, then the OFDM symbol time is decreased proportionally.

In LTE, a subframe is 1 ms long and is used to transmit a PDSCH or PUSCH, i.e. this is the TTI for a data transport block, while the corresponding measure in NR is a slot which scales with the numerology μ. Hence the OFDM slot time is $T = 2^{-\mu} \cdot 1$ [ms] and the number of symbols per slot is given by Table 2:

TABLE 2

Number of OFDM symbols per slot, slots per frame, and slots per subframe for normal cyclic prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In Table 2, it can also be seen that a frame has 10 slots when μ=0. That is, when the subcarrier spacing is 15 kHz, which is the same as a frame in LTE but for μ=3 when the subcarrier spacing is 120 kHz according to Table 1, then there are 80 slots per frame, i.e. per 10 ms. In a sense, a slot in NR is equivalent to a subframe in LTE. However, NR also has subframes, which are always 1 ms irrespective of the numerology, but subframes do not have any particular relevance in the NR physical layer except that they serve as a "clock", once per 1 ms; they may be useful for higher layer configurations. In addition, NR has frames, which are always 10 ms.

To summarize, each frame and subframe always have fixed time durations (10 ms and 1 ms), while slots have a time duration that depends on the numerology according to $T = 2^{-\mu} \cdot 1$ [ms].

Moreover, NR will support a larger maximum carrier (or BWP) bandwidth compared to LTE, partially achieved by changing the subcarrier spacing to be larger than 15 kHz but partially also to due to the fact that a larger total number of subcarriers can be used. For example, up to 3300 subcarriers are supported in NR. This means that a carrier can have up to 275 physical resource blocks (RBs) which have 12 subcarriers each.

For each numerology and carrier, a resource grid of $N_{RB,x}^\mu N_{sc}^{RB}$ subcarriers and $N_{symb}^{subframe,\mu}$ OFDM symbols is defined, where $N_{RB,x}^{max,\mu}$ is given by Table 3 and x is downlink (DL) or uplink (UL), respectively. Note that there is also a minimum bandwidth due to the fact that synchronization signals need to be transmitted and they have 20 RB bandwidth.

TABLE 3

Minimum and maximum number of resource blocks.

| μ | $N_{RB,DL}^{min,\mu}$ | $N_{RB,DL}^{max,\mu}$ | $N_{RB,UL}^{min,\mu}$ | $N_{RB,UL}^{max,\mu}$ |
|---|---|---|---|---|
| 0 | 20 | 275 | 20 | 275 |
| 1 | 20 | 275 | 20 | 275 |
| 2 | 20 | 275 | 20 | 275 |
| 3 | 20 | 275 | 20 | 275 |
| 4 | 20 | 138 | 20 | 138 |

One can now compute the maximum number or RB per radio frame by using Tables 2 and 3 and assuming the maximal bandwidth of 275 RB. For example, if μ=0, then there are 10*275=2750 RB per radio frame. However, if μ=3 then there are maximally 80*275=22000 RB per radio frame.

There currently exist certain challenge(s). As of today, there are no existing solutions for inter-RAT radio resource sharing. If two nodes need to coordinate resources to be used over a commonly shared spectrum, signaling used for resource allocation coordination should include information indicating how resources are distributed between the participating RATs. One problem to be solved is how to establish the role of the RAT that first decides on allocation of its own resources and consequently provides the other RAT with a range of resources that might be used.

Another important aspect is the way the resource allocation is represented in messages exchanged between two RATs. Taking the LTE-NR coexistence case for example, the straightforward way that has been used so far is to represent the resource allocation in terms of used/unused PRBs, as the PRB is the smallest schedulable resource unit. Nevertheless, the transmission of OCRS signals in LTE may occupy as little as a single OFDM symbol. This means that, if an LTE OCRS signal is to be transmitted inside the PRB allocated to NR, it may occupy only a few OFDM symbols of that PRB, where the remainder of the PRB can still be used by NR. The problem is, therefore, that a per PRB representation of allocated resources is not sufficient because such representation would not enable the secondary RAT to use the remaining symbol not used within a PRB. On the other side, if the resource allocation indication message encoding were done with symbol-level granularity, this would result in large signaling overhead and complex message structures due to representation of all the symbols in each PRB.

SUMMARY OF THE INVENTION

There are, proposed herein, various embodiments which address one or more of the issues disclosed herein. As one example, a method is disclosed for simplified representation of radio resource allocation indications that are exchanged between base stations, belonging to two different radio access technologies (RATs), operating in a spectrum sharing scenario.

According to certain embodiments, a method is provided for resource allocation between a first network node associated with a first RAT and a second network node associated with a second RAT where the first RAT and the second RAT use an overlapping spectrum. The method includes determining, by the first network node, one or more resources of a plurality of resources for use by the second network node. The plurality of resources is represented by a bit string. A message is transmitted to the second network node. The message includes the bit string in which the one or more resources for use by the second network node are indicated.

In some embodiments, the message may be a coordination message. In some embodiments, the plurality of resources may correspond to a resource grid. In some embodiments, each resource in the resource grid may be identified by a bit index in the bit string. In some embodiments, each bit, in the bit string, having a value of 0 may correspond to a particular one of the one or more resources available for use by the second network node. In some embodiments, a bit, in the bit string, having a value of 1 may correspond to a resource that is used by the first network node.

According to certain embodiments, a first network node associated with a first RAT includes processing circuitry operable to determine one or more resources of a plurality of resources for use by a second network node associated with a second RAT. The plurality of resources is represented by a bit string, and the first RAT and the second RAT use an overlapping spectrum, and to transmit to the second network node a message, which includes the bit string in which the one or more resources for use by the second network node are indicated.

According to certain embodiments, a method for resource allocation between a first network node associated with a first RAT and a second network node associated with a second RAT is provided. The first RAT and the second RAT use an overlapping spectrum, and the method includes receiving, from the first network node, a message including a bit string indicating one or more resources of a plurality of resources for use by the second network node and using the one or more resources indicated in the bit string.

According to certain embodiments, a first network node associated with a first RAT includes processing circuitry operable to receive, from a first network node associated with a second RAT, a message including a bit string indicating one or more resources of a plurality of resources for use by the second network node. The first RAT and the second RAT use an overlapping spectrum. The processing circuitry is further operable to use the one or more resources indicated by the bit string.

Certain embodiments may provide one or more of the following technical advantage(s). As one example, certain embodiments may advantageously solve the problem of exchanging information for resource coordination between nodes of RATs sharing the same time-frequency resources in an efficient and simple way. As another example, certain embodiments may provide methods addressing the encoding of radio resource allocation coordination information exchanged between base stations of two different RATs in a shared spectrum scenario. The scenario of interest is not present in today's mobile networks, where spectrum is not shared between different RATs. As still another example, certain embodiments may enable representation of resource allocation that results in smaller size of coordination messages than it would be the case if the full-fledged representation of resource grid was to be used. As such, another technical advantage may be more efficient processing of the information due to the simpler structure the information takes.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
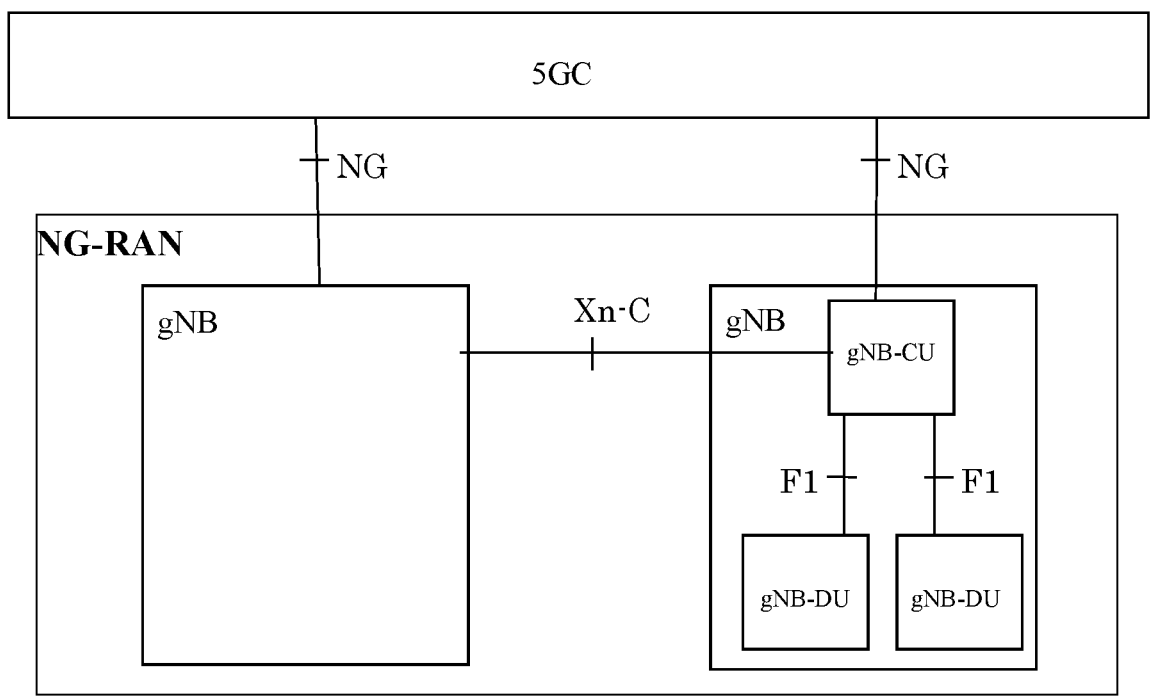
FIG. 1 illustrates the current 5G RAN architecture is described in TS 38.401.

Certain aspects of the present disclosure and their embodiments may provide solutions to the above-described and other challenges. For example, a problem solved by one or more embodiments of the present disclosure may be how to represent resources used by one RAT and how to efficiently encode resource allocation messages to be exchanged between two base stations of different RATs in a radio resource sharing scenario.

For example, according to certain embodiments, if the base stations of two co-located RATs use overlapping spectrum and are simultaneously transmitting or receiving, their respective DL and UL transmissions will mutually interfere. As used herein, the term co-located refers to two base stations that have overlapping coverage areas. This may degrade receiver performance, ultimately leading to poor signal quality and bit rate degradation. In order to enable resource sharing between base stations belonging to two different RATs that have overlapping coverage areas (i.e., co-located), a method is provided for representing the intended resource allocation for the RATs. These representations shall be placed inside the coordination messages that are exchanged between the base stations of two RATs, for the sake of resource coordination. The coordination messages shall be exchanged between base stations either via an existing procedure or a new procedure.

Co-located is not used herein to indicate base stations that are at the same physical location. Accordingly, the techniques for resource allocation disclosed herein are not limited to the resource sharing between two base stations of two different RATs located at the same-physical location. Rather, the techniques may also be applied to any physical placement of the two base stations of different RATs that results in an overlap of coverage areas of the two base stations.

According to certain embodiments, the disclosed solutions may assume that the node receiving a coordination message is aware of the cell identifier, carrier frequency, and bandwidth supported by each cell of the sending node, and, consequently, then knows the dimension of the entire resource grid. If the example of LTE-NR RATs is considered, the entire resource grid can be measured in PRBs. However, this example is non-limiting, and partition of time-frequency resources shared by two participating RATs may be based on the resource block size of any of the participating RATs.

According to certain embodiments, one of the two co-located base stations may be given the role of Master RAT (MRAT) and the other base station may play a role of Secondary RAT (SRAT). In this scenario, the radio resources to be shared originally belong to MRAT, where the outcome of resource sharing is that the MRAT gives part of its radio resources to the SRAT for an agreed period of time, hereby designated as an agreement period. As described herein, the term resource grid shall indicate all time-frequency resources subject to sharing during an agreement period.

According to certain embodiments relating to radio resource sharing, the SRAT indicates to MRAT its desired (amount of) resources in a particular occasion. The MRAT ultimately decides about which resources the MRAT will lend to the SRAT for the agreed period of time. Due to the existence of OCRS signals in MRAT and the fact that they overlap (in time and frequency) parts of resources allocated to SRAT, the MRAT shall also indicate to SRAT which parts of these resources (if any) are, occasionally or permanently, to be excluded from the allocation to SRAT. This example should be non-limiting, and any of the participating RATs may take the role of deciding how resources are divided, where backwards compatibility may be a non-binding example of the underlying reason for giving precedence to a certain RAT. However, for reasons of simplicity, it is assumed in this description that the MRAT has the mandate to decide about how the resources are divided.

While certain embodiments are described using an example of LTE-NR spectrum sharing where LTE is the MRAT, and NR is the SRAT, the disclosed solutions are not limited to LTE and NR RATs.

According to certain embodiments, which may be referred to herein as Analytical PRB Description (APD), the eNB indicates to gNB which parts of the resource grid are allocated to gNB. From this indication the gNB deduces all the PRBs that constitute all the resources assigned to it. For every PRB in the gNB resources that is overlapped by one or more LTE OCRS signals (if any), the eNB provides to the gNB the indication of which exact symbols in these PRBs are occupied by LTE OCRS transmissions and therefore excluded from resources allocated to the gNB. Therefore, the symbol-level granularity in resource allocation indication is optional and subject to the existence of OCRS signals in a specific PRB. Such symbol-level granularity is provided only for the opportunely identified PRBs where OCRS is present.

According to certain other embodiments, which may be referred to herein as Explicit PRB Description (EPD), the full space of time-frequency resources shared between the master and secondary RAT is expressed in terms of PRBs. The MRAT can indicate whether any of the expressed PRBs is used. PRBs that are not used by the MRAT will be marked opportunely. For example, if a PRB is expressed as a bit, value 1 means the PRB is used by MRAT, while value 0 means the PRB is used by SRAT. In this embodiment, the PRBs within which OCRS signals are transmitted are opportunely identified. For these PRBs, a detailed per-symbol representation is provided, showing which symbol is used by OCRS signals and which is free to be used by other signals.

According to certain embodiments, the resource allocation information exchanged in spectrum sharing between two base stations of different RATs may be cell-specific. Thus, the resource allocation information may be valid for the entire cell, meaning that the RAT that is assigned certain radio resources (on UL, DL, or both) may use these resources at its own convenience such as, for example, for broadcast, multicast or transmissions to and from particular UE(s) in its cell. It should be noted that a cell may be associated to spectrum that is used in a supplementary way, namely that is activated and deactivated on a per need basis. By "cell resources" herein it is intended all the resources that can be used by a cell.

As mentioned earlier, the precedence of MRAT in resource sharing is a non-binding example, and any of the participating RATs may take the role of deciding how resources are divided. For the sake of simplicity, it is assumed in this description that the MRAT has the mandate to decide about how the resources are divided. The MRAT may allocate to the SRAT its entire bandwidth or parts therein for agreed periods of time.

The allocation of radio resources that are represented via an analytical PRB description will now be described in more detail. Specifically, in a particular embodiment, the radio resources to be shared during an agreement period may be graphically represented by a rectangular time-frequency grid of PRBs. As used herein, each PRB or each RE may correspond to a grid element. Taking the LTE PRB as a non-binding example, the size of a PRB is 12×15 kHz=180 kHz in the frequency dimension, and 1 ms (i.e. time duration of 14 OFDM symbols or one subframe) in the time dimension. For a 20-MHz LTE carrier, there will be 110 PRBs in carrier bandwidth. Thus, the resource grid will have 110 rows. If, in a particular embodiment, the agreement period equals 40 subframes, the PRB grid will have 40 columns. Therefore, the size of frequency-dimension of the resource grid equals the total bandwidth to be shared between the two RATs, measured in the corresponding number of PRBs. The size of the time-dimension of the resource grid equals to the agreement period, measured in the corresponding number of PRBs.

In multi-RAT resource sharing, the MRAT will assign to SRAT, with PRB granularity, certain areas of the resource grid. A portion of the resource grid allocated to SRAT (and possibly consisting of multiple PRBs) is hereby designated as a territory (or resource area). All territories in a resource grid of an agreement period are either rectangular or can be decomposed into rectangular constituents, hereby designated as resource rectangles (RR). An RR can be composed of at least one PRB. Any non-rectangular territory can be decomposed into RRs, because the grid is made of PRBs, where one PRB corresponds to one element of the resource grid, which is, by definition, rectangular. It has to be noted that the representation described herein takes PRBs into account but it could apply to any other measure of time-frequency resources, like for example a resource block in the 5G NR RAT.

Therefore, the resource allocation can be described by decomposing the territories into RRs and analytically describing coordinates of each of the RRs in the resource grid. Having in mind that a rectangle can be unambiguously defined by the coordinates of its two opposite vertices (upper left and lower right, being a non-binding example), in order to analytically describe a RR inside a resource grid it is sufficient to indicate the positions of two of the PRBs that constitute it, i.e. the ones corresponding to the two of its opposite vertices (upper left and lower right vertices, being a non-binding example).

Figure 2:
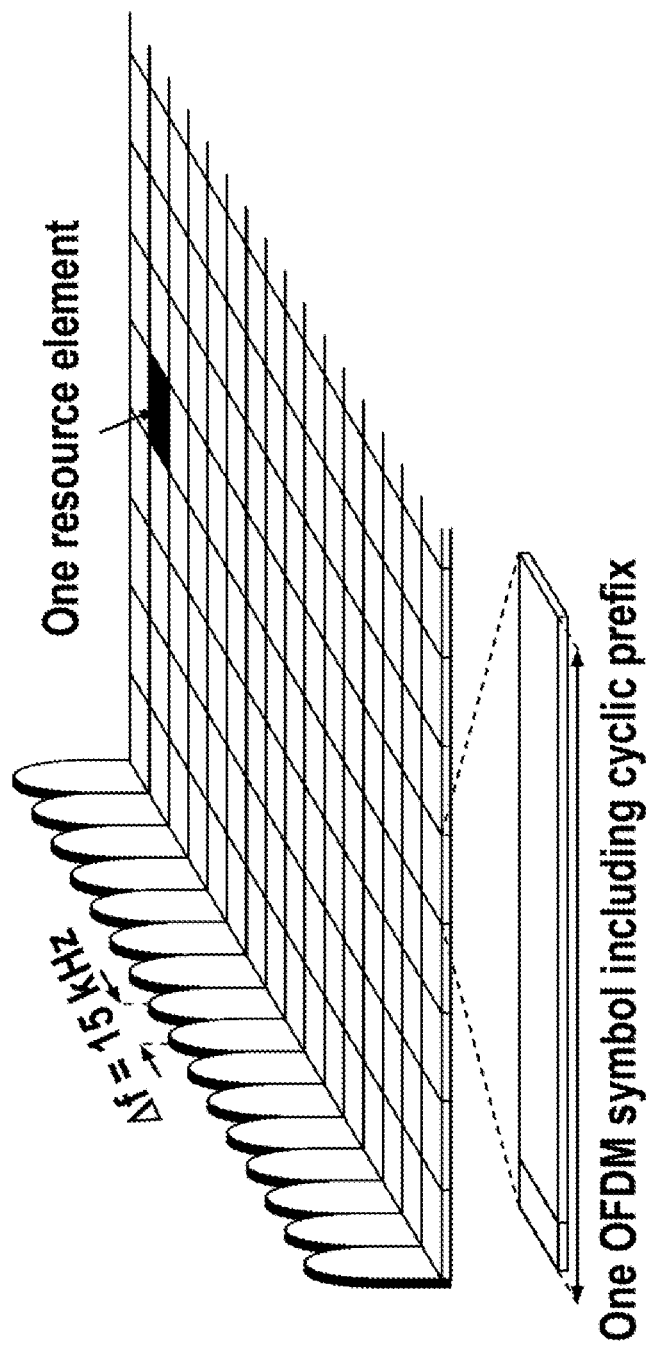
FIG. 2 illustrates the basic LTE and NR physical resource structure as a time-frequency grid where each resource element corresponds to one subcarrier during one OFDM symbol interval.
Figure 3:
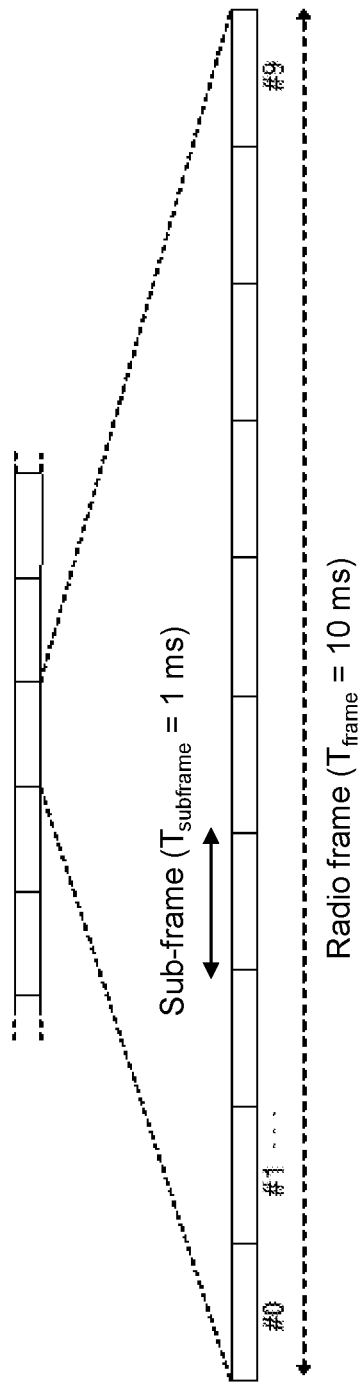
FIG. 3 illustrates the LTE time domain structure.
Figure 4:
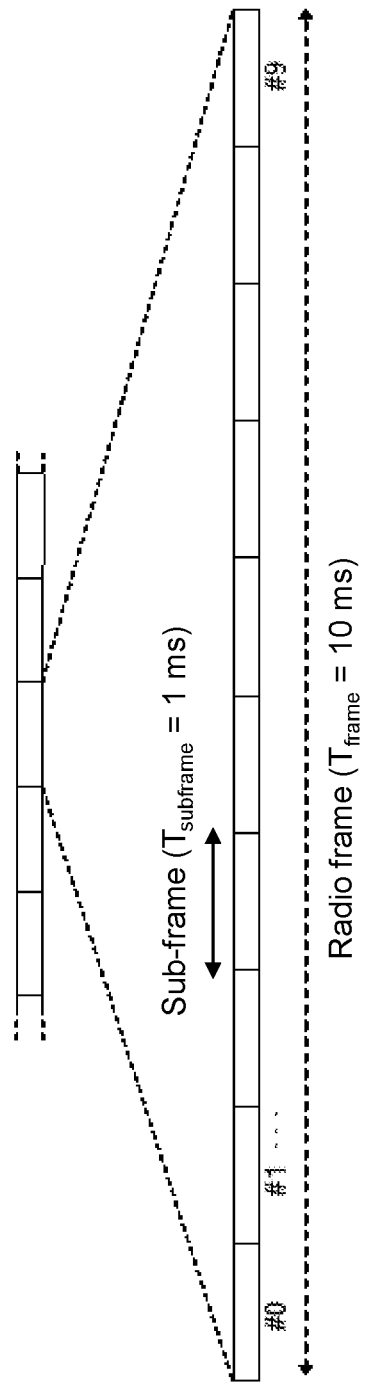
FIG. 4 illustrates the NR time domain structure.

The position of a PRB inside the grid is described by a vertical and a horizontal coordinate. Taking a non-binding example from FIG. 2, discussed above, the vertical coordinate corresponds to the frequency and the horizontal coordinate corresponds to the time. In that case, the range of the vertical coordinate depends on how many PRBs fit into the shared bandwidth, where the vertical coordinate of the PRB located at the lower edge of the bandwidth equals 1. In the non-binding example of a 20-MHz LTE carrier, the range of vertical coordinates of the PRBs would be from 1-110. The range of the horizontal coordinates depends on the duration of the agreement, and is measured in the corresponding number of PRBs, which in the case of LTE, equals the number of subframes. The PRB having the lowest time and frequency coordinates has coordinates (1,1) and is located in the lower left corner of the resource grid. The following PRBs in the increasing order of frequencies (i.e. increasing frequency coordinate) have the same time coordinates as the first PRB up to the point where the RR frequency span (i.e. RR bandwidth, the vertical dimension) terminates, and following PRBs start from the next higher time coordinate and so on.

According to a particular embodiment, the MRAT may indicate, in the resource allocation description sent to SRAT, the territories by decomposing them into RRs and analytically describing each RR by stating the coordinates of the upper left and lower right PRB inside the RR.

As discussed above, since the resource allocations of OCRS signals may overlap the territories, the MRAT should indicate to the SRAT which parts of the territories and RRs are excluded from the allocation. These exclusions might comprise entire PRBs or parts of PRBs such as, for example, symbols. In the remainder of this disclosure, the PRBs that are constituents of RRs, but whose parts are excluded from the allocation shall be designated as punctured PRBs.

According to certain embodiments, the MRAT may indicate to SRAT all the PRBs that are punctured. In a particular embodiment, one example of how to indicate such information is to use a bit string representation of length equal to the number of PRBs in that particular RR. Here, each bit in the bit string represents a PRB, where the PRB corresponding to the first bit in the string has the lowest time and frequency coordinates. The following PRBs in the increasing order of frequencies (i.e. increasing frequency coordinate) have the same time coordinates as the first PRB up to the point where the RR frequency span (i.e. RR bandwidth, the vertical dimension) terminates, and following PRBs start from the next higher time coordinate and so on. The punctured PRBs in the bit string are indicated by bit value '1', the unpunctured ones are indicated by a '0'.

According to certain embodiments, for each of the punctured PRBs, the MRAT may send to SRAT a bit string of length equal to the number of symbols in a PRB. Here, each bit in the bit string represents a symbol inside a PRB, where the symbol corresponding to the first bit in the string has the lowest time and frequency coordinates. The following symbols in the increasing order of frequencies (i.e. increasing frequency coordinate) have the same time coordinates as the first symbol up to the point where the PRB frequency span (i.e. PRB bandwidth) terminates, and following symbols start from the next higher time coordinate and so on. The symbol positions that are excluded from the resources allocated to SRAT, and are to be used for transmission of OCRS signals, are indicated by bit value '1', the unpunctured ones are indicated by a '0'.

According to certain embodiments, the coordination message may contain some or all of the following information:
  Agreement duration, expressed in the number of PRBs;
  Coordinates of all RRs in the resource grid (analytical representation);
  For every RR in the resource grid, the positions of all punctured PRBs within the RR;
  For every punctured PRB in every RR, the positions of all punctured symbols within the PRB.

The content of an example coordination message that is sent from the MeNB to the SgNB is shown in Table 4.

TABLE 4

Example coordination message from the MeNB to the SgNB

Direction: MeNB → SgNB.

| IE/Group Name | Presence Range | IE type and reference | Semantics description | Criticality | Assigned Criticality |
|---|---|---|---|---|---|
| Message Type | M | | Radio resource allocation indication message | YES | reject |
| Duration of the agreement | M | INTEGER (1 . . . 40) | The time duration for which the radio resource division between LTE and NR is valid (expressed in the number of PRBs). Here it is assumed that the agreement can be valid for up to 40 PRBs. | YES | reject |

TABLE 4-continued

Example coordination message from the MeNB to the SgNB

| | | | | | | |
|---|---|---|---|---|---|---|
| MeNB Resource Allocation Information | M | | | Indication of resources assigned by MeNB to SgNB. | YES | reject |
| >RRs list | | 0 . . . 1 | | | YES | reject |
| >>RRs item | | 1 . . . <noofPRBsInGrid> | | | EACH | ignore |
| >>>Upper left PRB's frequency dimension coordinate | M | | INTEGER (1, numofPRBsinCarrierBandwidth) | The coordinates of upper left and lower right PRB of RR. The coordinates are with respect to the entire resource grid. | — | — |
| >>>Upper left PRB's time dimension coordinate | M | | INTEGER (1, numofPRBsinAgreementPeriod) | | — | — |
| >>>Lower right PRB's frequency dimension coordinate | M | | INTEGER (1, numofPRBsinCarrierBandwidth) | | — | — |
| >>>Lower right PRB's time dimension coordinate | M | | INTEGER (1, numofPRBsinAgreementPeriod) | | — | — |
| >>>Number of punctured PRBs in the RR | M | | INTEGER (o . . . <noofPRBsInRR>) | The number of punctured PRBs in the RR. | — | — |
| >>>Punctured PRBs in RR, list of | | 0 . . . 1 | | | YES | reject |
| >>>>Punctured PRBs in RR item | O | 1 . . . <noofPRBsInPR> | | List of PRBs (inside the RR) that are overlapped by LTE OCRS transmissions. | EACH | ignore |
| >>>>>Punctured PRB position inside RR | O | | INTEGER (1, numofPRBsinAgreementPeriod) | The indication of punctured PRBs in an RR. Each bit in the bit string represents a PRB inside the RR. Bit string value "1" indicates a PRB punctured by an LTE OCRS transmission; value "o" indicates an unpunctured PRB. The PRB corresponding to the first bit in the string has the lowest time and frequency coordinates, and following PRBs have the same time coordinates as the first PRB up to the point where the RR frequency span (i.e. RR bandwidth) terminates, and following PRBs start from the next higher time coordinate and so on. | — | — |

TABLE 4-continued

Example coordination message from the MeNB to the SgNB

| | | | | | |
|---|---|---|---|---|---|
| >>>>>Punctured symbols position inside the PRB | O | BIT STRING (1 . . . numofSyminPRB> | The indication of punctured symbols in a PRB. Each position in the string represents a symbol in a PRB. Bit string value "1" indicates a symbol punctured by an LTE OCRS transmission; value "o" indicates an unpunctured symbol. The symbol corresponding to the first bit in the string has the lowest time and frequency coordinates, and following symbols have the same time coordinates as the first symbol up to the point where the PRB frequency span (i.e. PRB bandwidth) terminates, and following symbols start from the next higher time coordinate and so on. | — | — |

| Range bond | Explanation |
|---|---|
| noofPRBsInGrid | The total number of PRBs in a resource grid. |
| noofPRBsInGrid | The total number of PRBs in this RR. |
| numofSyminPRB | The number of symbols in a PRB. |
| numofPRBsinCarrierBandwidth | The number of PRBs that can fit into carrier bandwidth. |
| numofPRBsinAgreementPeriod | The number of PRBs that can fit into the agreement period. |

In a particular embodiment of the APD embodiment, a territory can be approximated by a rectangular structure. This approximation is sent to the SRAT, together with the correction of the approximation, which may include, for example, the differences between the true RR and the approximation. The approximation can be represented by using the APD RR description method, while the correction (i.e. the entire PRBs to be excluded from the approximation in order to obtain the true RR) can be indicated using the APD mechanism for representing the punctured PRBs inside the RR. Symbol puncturing can be represented by using the corresponding method from the APD embodiment.

In another particular embodiment, the territories or resource areas can be represented by one numeric index. This may be achieved by representing the entire time-frequency grid of shared resources between the MRAT and SRAT as a bit string, where each bit corresponds to the unit of measure of time frequency resources. Such unit of measure can, for example, be chosen as one PRB. Each PRB in the resource grid can be considered as a bit in a bit string. Adjacent PRBs are associated to adjacent bits. For example, Bit one may correspond to the PRB having the lowest time and frequency coordinates, e.g. (1, 1). Following bits may correspond to PRBs with increasing order of frequencies (i.e. increasing frequency coordinate) and the same time coordinates as the first PRB up to the point where the resource grid frequency span (i.e. bandwidth, the vertical dimension) terminates. Following PRBs start from the next higher time coordinate and so on. In this way, a territory or resource area can be expressed as the index of the bit corresponding to the top left PRB and the index of the bit corresponding to the bottom right PRB. Therefore, each RR may be analytically represented by a set of two numbers. For each RR, these two numbers indicate an interval in a bit string representation of the resource grid, where each string bit corresponds to a PRB. Taking LTE-NR spectrum sharing as a non-binding example, and assuming the previously defined conversion of PRB representation from a resource grid to a bit string, a contiguous streak of 1's in the bit string corresponds to a situation where the SRAT is, within one subframe, allocated a contiguous frequency band consisting of several PRBs. Symbol puncturing can be represented by using the corresponding method from the APD embodiment.

As described above, according to certain other embodiments, the radio resources may be represented via an explicit description. The allocation of radio resources that are represented via explicit PRB description will now be described in more detail.

Specifically, according to certain embodiments, the grid of resources shared between the MRAT and SRAT may be represented via a bit string, as in the embodiments described in the previous method. Therefore, each PRB in the resource grid can be identified by the index of the bit it corresponds to in the string. If the bit is set to "0" it means the corresponding PRB is not used by the MRAT and can be used in full by the SRAT. If the bit is marked with "1" it means the corresponding PRB is used in full or in part.

Together with this information. the MRAT may also send to SRAT an indication of all the punctured PRBs. This can be achieved, for example, by signaling the bit index corresponding to the punctured PRB. Together with such index. the MRAT can provide a bit string representing all the symbols within the punctured PRB, as described in one of the previous embodiments. Each bit in the bit string may represent a symbol and, if the bit is set to "0", the symbol is not utilized. By contrast, if it is set to "1", the symbol is used by the MRAT. This allows the SRAT to utilize the unused symbols if needed.

Though it is described in the examples above that the information is sent from the MRAT to the SRAT, the information may additionally or alternatively be sent from the SRAT to the MRAT, in other embodiments. Accordingly, the techniques described above may also be used to allow the SRAT to indicate its utilized resources to the MRAT.

The described techniques solve the problem of exchanging information for resource coordination between nodes of RATs sharing the same time-frequency resources in an efficient and simple way.

In yet another particular embodiment, the SRAT node may request a partition of the shared resources from the MRAT node by using a structure identical to the one described in previous embodiments and therein assigned by the MRAT node. In this embodiment, the positions of requested resources in the resource grid are explicitly stated in the resource allocation message. The SRAT node may use either of the two message structures stipulated by APD or EPD methods.

In still another embodiment, the SRAT node may demand a share of radio resources, leaving to the MRAT node the final decision of whether such resources are to be assigned to the secondary node or not. The secondary node may indicate whether the requested amount of resources should be granted in every subframe for a number of subframes or as an aggregate amount of resources granted over a number of subframes. The corresponding message structure is shown in Table 5 below.

TABLE 5

Example coordination message from the SgNB to the MeNB

Direction: SRAT → MRAT

| IE/Group Name | Presence | Range | IE type and reference | Semantics description | Criticality | Assigned Criticality |
|---|---|---|---|---|---|---|
| Message Type | M | | | | YES | reject |
| Resource request description | | | | | YES | reject |
| >Type of request validity | M | | ENUMERATED (perSFforaNumofSFs, inTotalOveraNumofSFs) | Whether the request refers to: 1) aggregate requested number of PRBs assigned over a period of time or 2) the number of PRBs requested per subframe, assigned for a number of subframes. Assumption is that maximum duration of the agreement is 40 subframes. | YES | reject |
| >Time duration of the request validity | M | | INTEGER (1, 40) | For how long is the request valid, expressed in the number of subframes. Assumption is that maximum duration of the agreement is 40 subframes. | YES | reject |

TABLE 5-continued

| Example coordination message from the SgNB to the MeNB ||||||
|---|---|---|---|---|---|
| Amount of resources requested | M | INTEGER (1, maxNumofPRBsrequested) | The request for radio resources sent from the Secondary to the Master node in multi-RAT spectrum sharing scenario, expressed in the number of PRBs. | YES | reject |
| Message Type | M | | | YES | reject |
| Resource request description | | | | YES | reject |
| >Type of request validity | M | ENUMERATED (perSFforaNumofSFs, inTotalOveraNumofSFs) | Whether the request refers to: 1) aggregate requested number of PRBs assigned over a period of time or 2) the number of PRBs requested per subframe, assigned for a number of subframes. Assumption is that maximum duration of the agreement is 40 subframes. | YES | reject |
| >Time duration of the request validity | M | INTEGER (1, 40) | For how long is the request valid, expressed in the number of subframes. Assumption is that maximum duration of the agreement is 40 subframes. | YES | reject |
| Amount of resources requested | M | INTEGER (1, maxNumofPRBsrequested) | The request for radio resources sent from the Secondary to the Master node in multi-RAT spectrum sharing scenario, expressed in the number of PRBs. | YES | reject |

| Range bound | Explanation |
|---|---|
| maxNumofPRBsrequested | Maximum number of PRBs that the SRAT node can request from the MRAT node. Equals the product of the number of PRBs in a subframe of MRAT and the time duration of the request validity, expressed in the number of PRBs. |

Figure 5:
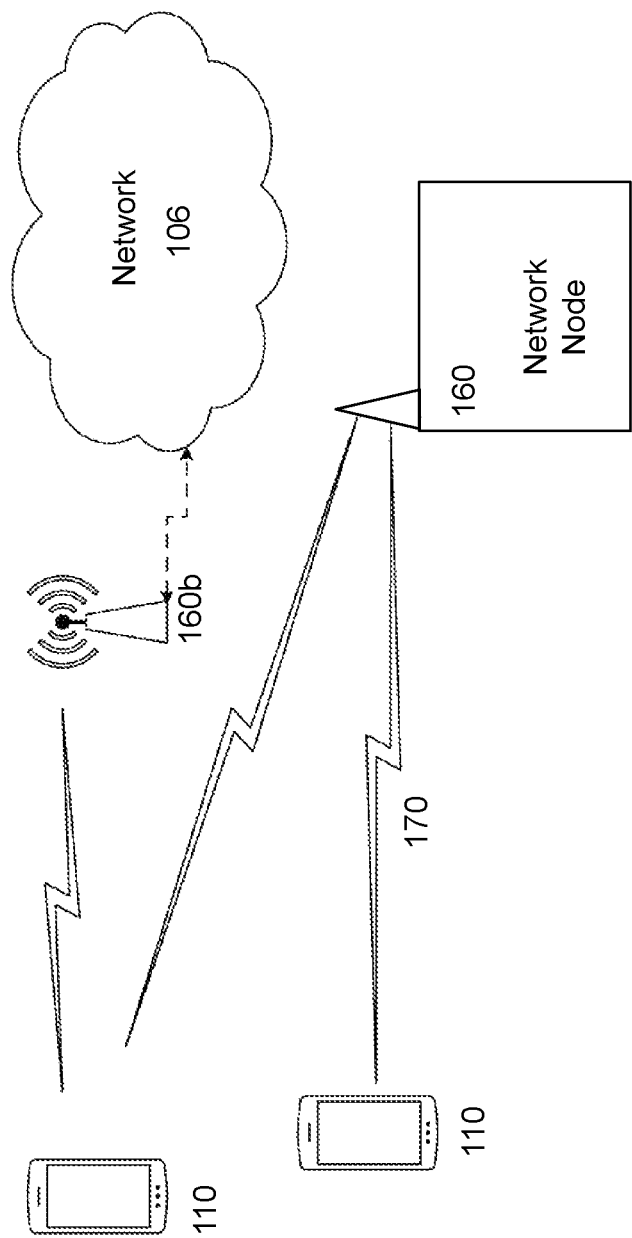
FIG. 5 illustrates an example network for resource allocation between network nodes using an overlapping spectrum, according to certain embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and WDs 110. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
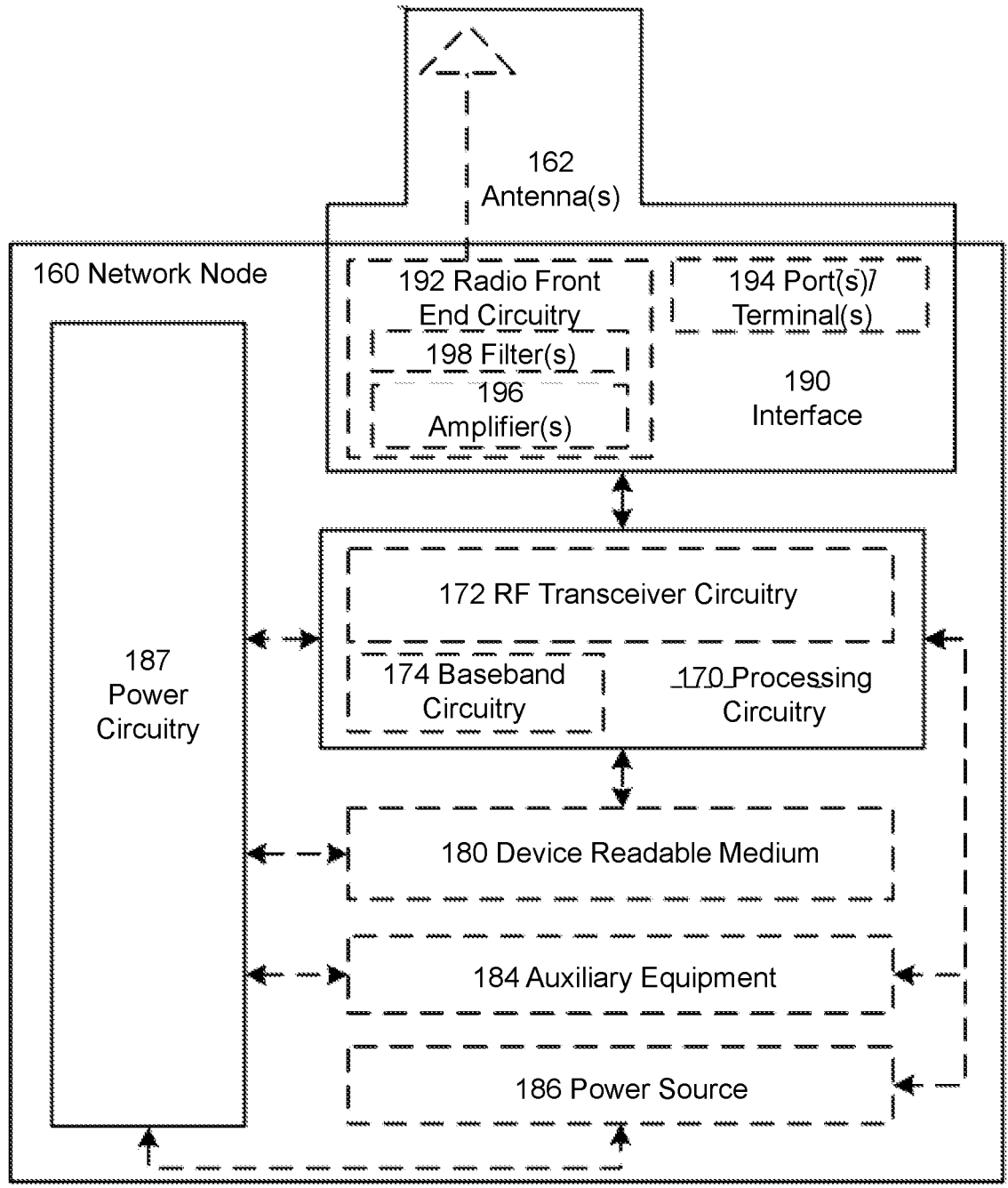
FIG. 6 illustrate an example network node for resource allocation between network nodes using an overlapping spectrum, according to certain embodiments.

FIG. 6 illustrates an example network node 160 for resource allocation between network nodes using an overlapping spectrum, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes 160 include, but are not limited to, access points (APs) (e.g., radio access points), base stations (BSs) (e.g., radio base stations, Node Bs, evolved Node Bs (eNBs), eNB relays, NR NodeBs (gNBs)) or IAB nodes. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node 160 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
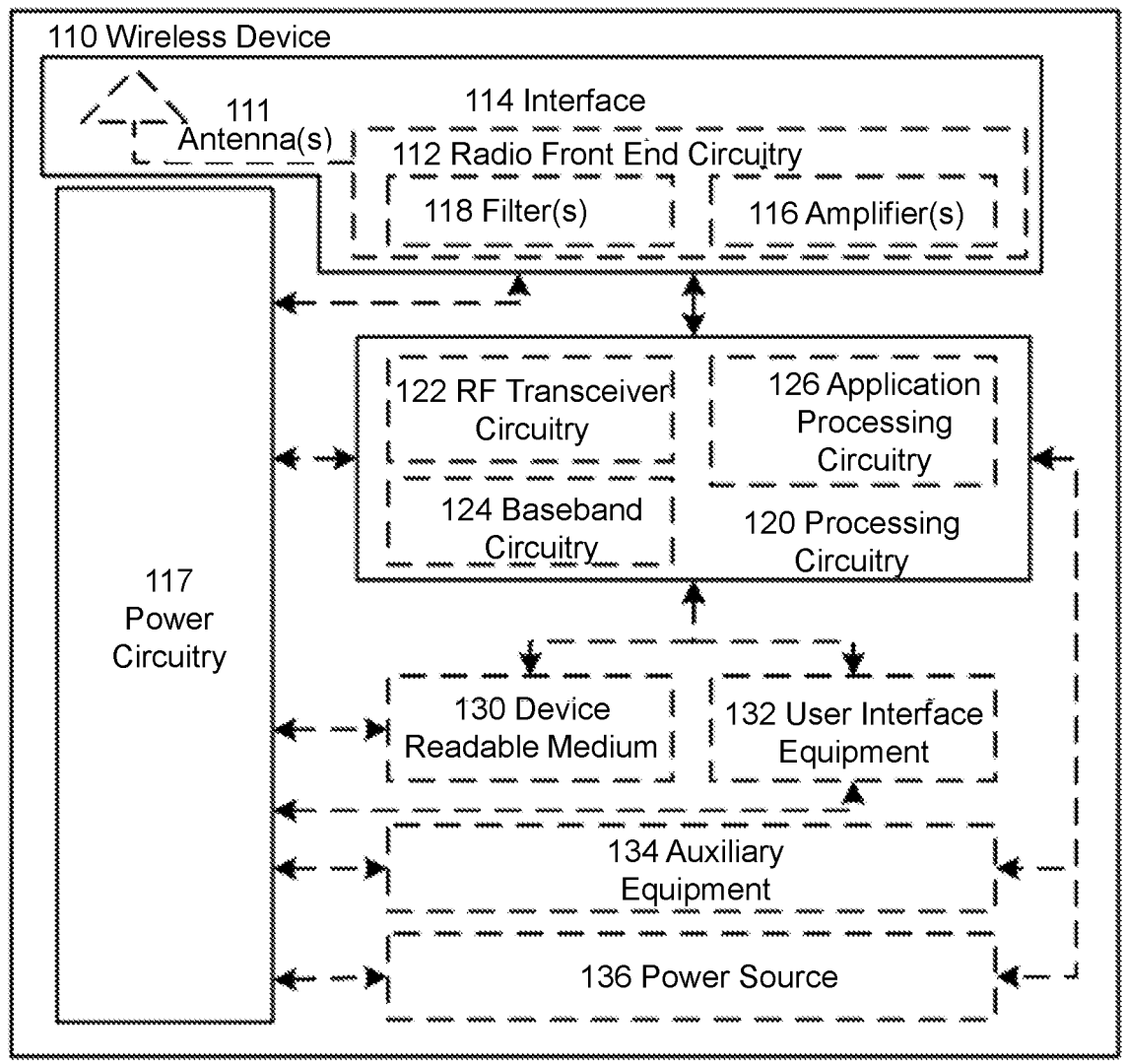
FIG. 7 illustrates an exemplary wireless device for resource allocation between network nodes using an overlapping spectrum, according to certain embodiments.

FIG. 7 illustrates an example wireless device (WD) node 110 for resource allocation between network nodes 160 using an overlapping spectrum, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136, and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 8:
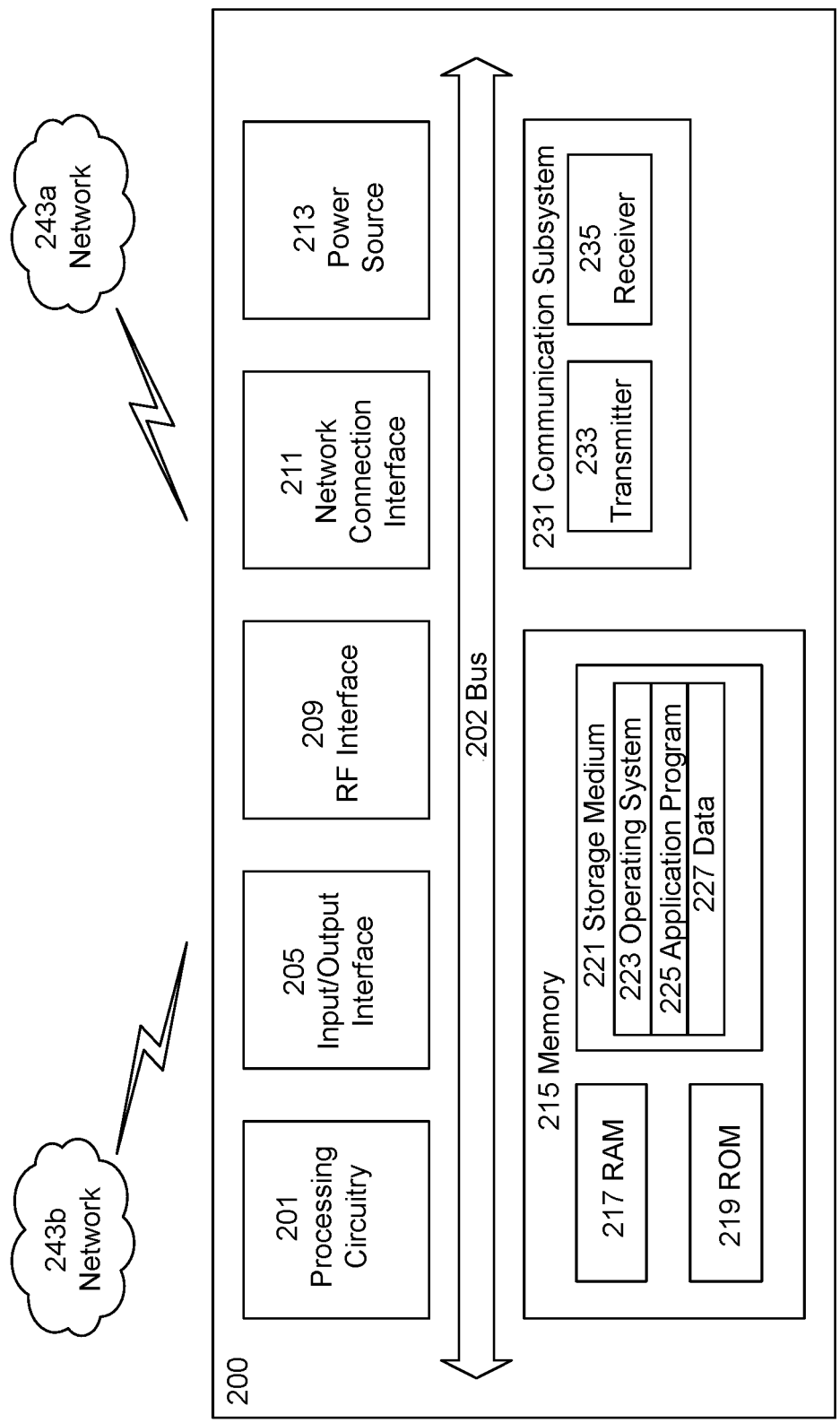
FIG. 8 illustrates an example user equipment (UE) for resource allocation between network nodes using an overlapping spectrum, according to certain embodiments.

FIG. 8 illustrates one embodiment of a UE 200 for resource allocation between network nodes 160 using an overlapping spectrum, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
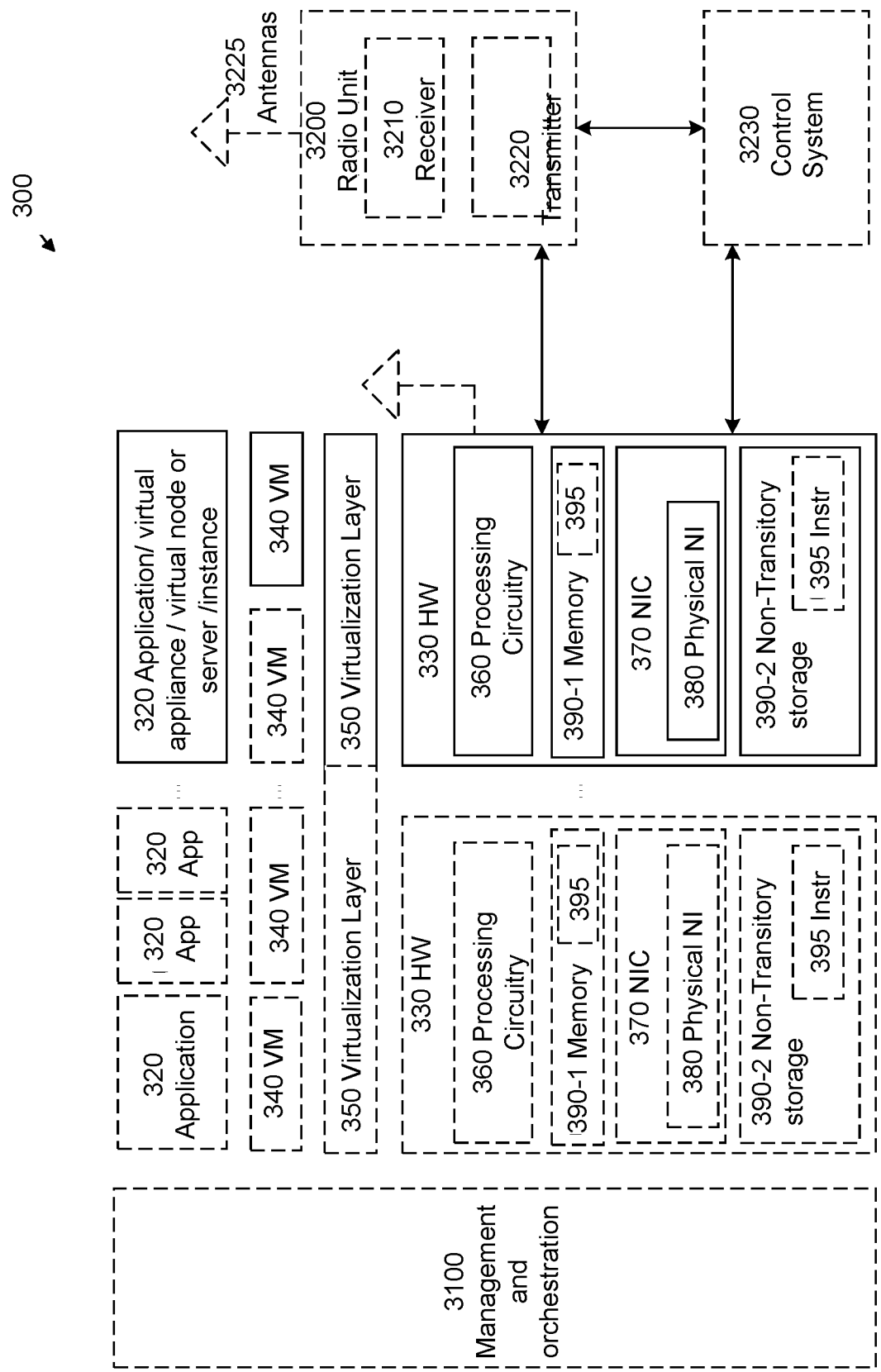
FIG. 9 illustrates an example virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 10:
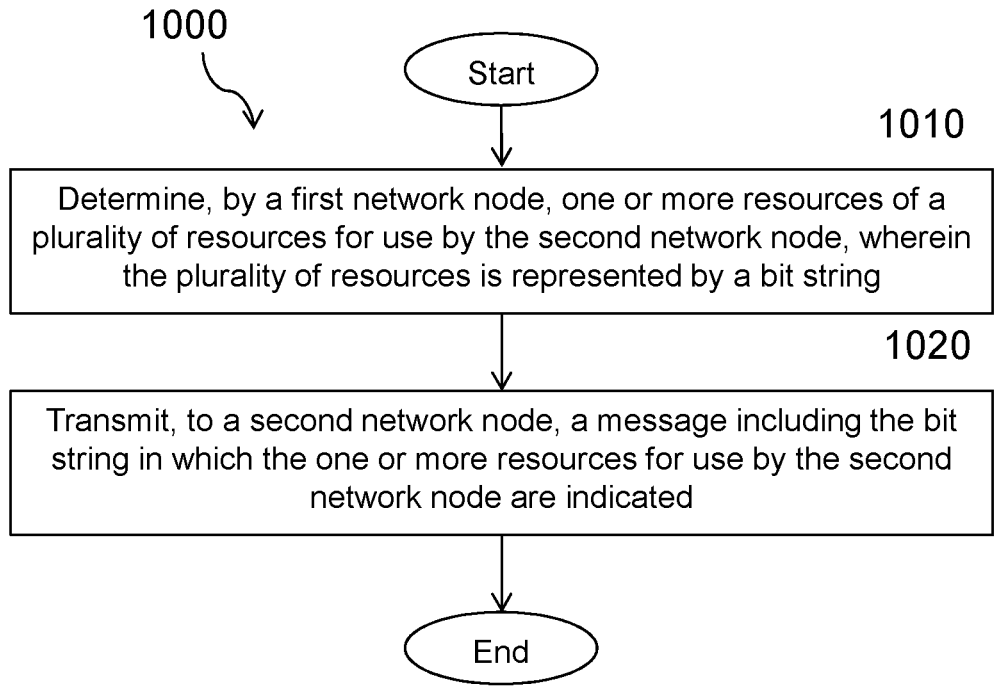
FIG. 10 illustrates an example method by a network node for resource allocation between network nodes using an overlapping spectrum, according to certain embodiments.

FIG. 10 illustrates an example method 1000 for resource allocation between a first network node associated with a first RAT and a second network node associated with a second RAT, wherein the first RAT and the second RAT use an overlapping spectrum.

In a particular embodiment, the first RAT and the second RAT are the same. In a particular embodiment, the first network node is associated with a first coverage area and the second network node is associated with a second coverage area. At least a portion of the first coverage area and a portion of the second coverage area are overlapping.

At step 1010, the first network node determines one or more resources of a plurality of resources for use by the second network node. The plurality of resources is represented by a bit string.

In a particular embodiment, the plurality of resources corresponds to a resource grid. In a further particular embodiment, each resource in the resource grid may be identified by a bit index in the bit string.

It should be noted that a resource may correspond to a PRB, a time-frequency resource, a resource element, etc.

At step 1020, the first network node transmits, to the second network node, a message including the bit string in which the one or more resources for use by the second network node are indicated.

In a particular embodiment, the message is a coordination message.

In a particular embodiment, each bit in the bit string that has a value of 0 may correspond to a particular one of the one or more resources available for use by the second network node.

In a particular embodiment, each bit in the bit string that has a value of 1 may correspond to a resource that is used by the first network node.

In a particular embodiment, the message may further indicate a full space of time and/or frequency resources expressed as a plurality of PRBs that are shared between the first network node and the second network node. For example, in a particular embodiment, the message may include a first value or a second value for each respective one of the plurality of PRBs. If the message comprises the first value for a respective one of the plurality of PRBs, the respective one of the plurality of PRBs may be assigned to the first network node using the first RAT. Otherwise, if the message comprises the second value for a respective one of the plurality of PRBs, the respective one of the plurality of PRBs may be assigned to the second network node using the first RAT.

In a particular embodiment, a bit value of 0 may represent a resource that is shared and a bit value of 1 may represent a resource that is not available.

In a particular embodiment, the first RAT is a master RAT and the second RAT is a secondary RAT. The one or more resources may be assigned to the first network node prior to transmitting the message to the second network node. In one example, the master RAT may be LTE and the secondary RAT may be NR.

In a particular embodiment, the message may include an agreement time period during which the one or more resources may be used by the second RAT.

In a particular embodiment, the first network node may be an eNodeB and the second network node may be a gNodeB.

In a particular embodiment, the method may further include receiving, by the first network node, a request from the second network node, and the request may indicate a desired amount of resources. The one or more resources determined for use by the second network node may include the desired amount of resources.

In another particular embodiment, the method may further include receiving, by the first network node, a request from the second network node, and the request may indicate the one or more resources. The message may be transmitted in response to the request.

In a particular embodiment, the message may further include one or more additional resources that are associated with OCRS signals and are excluded from the one or more resources.

Figure 11:
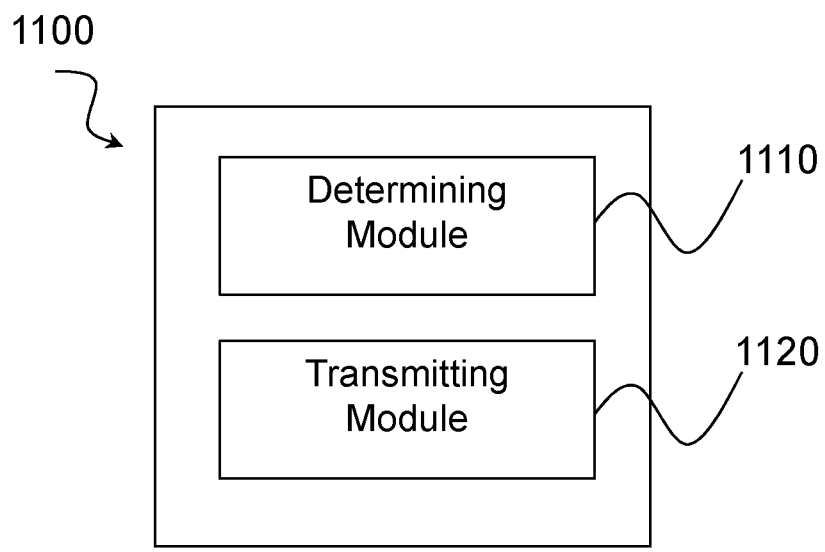
FIG. 11 illustrates an example virtual computing device for resource allocation between network nodes using an overlapping spectrum, according to certain embodiments.

In certain embodiments, the method for resource allocation between network nodes using an overlapping spectrum as described above may be performed by a computer networking virtual apparatus. FIG. 11 illustrates an example virtual computing device 1100 for resource allocation between network nodes using an overlapping spectrum, according to certain embodiments. In certain embodiments, virtual computing device 1100 may include modules for performing steps similar to those described above with regard to the method illustrated and described in FIG. 10. For example, virtual computing device 1100 may include at least one determining module 1110, a transmitting module 1120, and any other suitable modules for resource allocation between network nodes using an overlapping spectrum. In some embodiments, one or more of the modules may be implemented using processing circuitry 170 of FIG. 6. In certain embodiments, the functions of two or more of the various modules may be combined into a single module.

The determining module 1110 may perform the determining functions of virtual computing device 1100. For example, In a particular embodiment, determining module 1110 may determine one or more resources of a plurality of resources for use by the second network node. The plurality of resources is represented by a bit string.

The transmitting module 1120 may perform the transmitting functions of virtual computing device 1100. For example, in a particular embodiment, transmitting module 1120 may transmit, to the second network node, a message including the bit string in which the one or more resources for use by the second network node are indicated.

Other embodiments of virtual computing device 1100 may include additional components beyond those shown in FIG. 11 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 12:
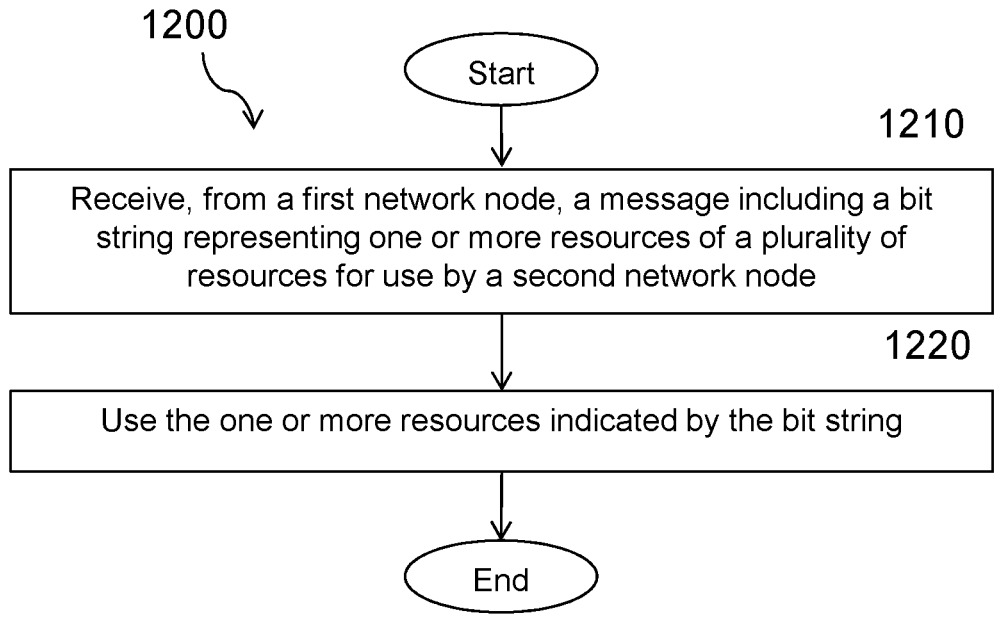
FIG. 12 illustrates another example method by a network node for resource allocation between network nodes using an overlapping spectrum, according to certain embodiments.

FIG. 12 illustrates another example method 1200 for resource allocation between a first network node associated with a first RAT and a second network node associated with a second RAT, wherein the first RAT and the second RAT use an overlapping spectrum.

In a particular embodiment, the first RAT and the second RAT may be the same.

In a particular embodiment, the first network node is associated with a first coverage area, and the second network node is associated with a second coverage area. At least a portion of the first coverage area and the second coverage area are overlapping.

In a particular embodiment, for example, the first network node may include an eNodeB and the second network node may include a gNodeB.

At step 1210, the second network node receives, from the first network node, a message including a bit string representing one or more resources of a plurality of resources for use by the second network node.

In a particular embodiment, the message is a coordination message.

In a particular embodiment, the plurality of resources corresponds to a resource grid. In a further particular embodiment, each resource in the resource grid may be identified by a bit index in the bit string.

In a particular embodiment, each bit in the bit string that has a value of 0 may correspond to a particular one of the one or more resources available for use by the second network node.

In a particular embodiment, each bit in the bit string that has a value of 1 may correspond to a resource that is used by the first network node.

It should be noted that the values of the bits could be changed for indicating the resources to be shared, as will be appreciated by a person skilled in the art. For example, in some embodiments, the bit having a value 0 may correspond to a resource that is used by the first network. As such, this resource is not available for sharing.

In some embodiments, the bit value of 1 may correspond to a particular on resource available for use by the second network node.

In a particular embodiment, the message may further indicate a full space of time and or frequency resources expressed as a plurality of PRBs that are shared between the first network node and the second network node. For example, in a particular embodiment, the message may include a first value or a second value for each respective one of the plurality of PRBs. If the message comprises the first value for a respective one of the plurality of PRBs, the respective one of the plurality of PRBs is assigned to the first network node using the first RAT. On the other hand, if the message comprises the second value for the respective one of the plurality of PRBs, the respective one of the plurality of PRBs is assigned to the second network node using the second RAT.

In a particular embodiment, a bit value of 0 may represent a resource that is shared, and a bit value of 1 may represent a resource that is not available.

In a particular embodiment, the first RAT is a master RAT and the second RAT is a secondary RAT, and the one or more resources are assigned to the first network node prior to the message being received by the second network node. For example, the master RAT may be LTE, and the secondary RAT may be NR.

In a particular embodiment, the message includes an agreement time period during which the one or more resources may be used by the second RAT.

At step 1220, the second network node uses the one or more resources represented by the bit string.

In a particular embodiment, the method may further include transmitting, to the first network node, a request indicating a desired amount of resources, and the one or more resources identified for use by the second network node may include the desired amount of resources.

In another particular embodiment, the method may further include transmitting, to the first network node, a request indicating the one or more resources, and the message may be received by the second network node in response to the request.

In a particular embodiment, the message may include one or more additional resources that are associated with OCRS signals and are excluded from the one or more resources.

Figure 13:
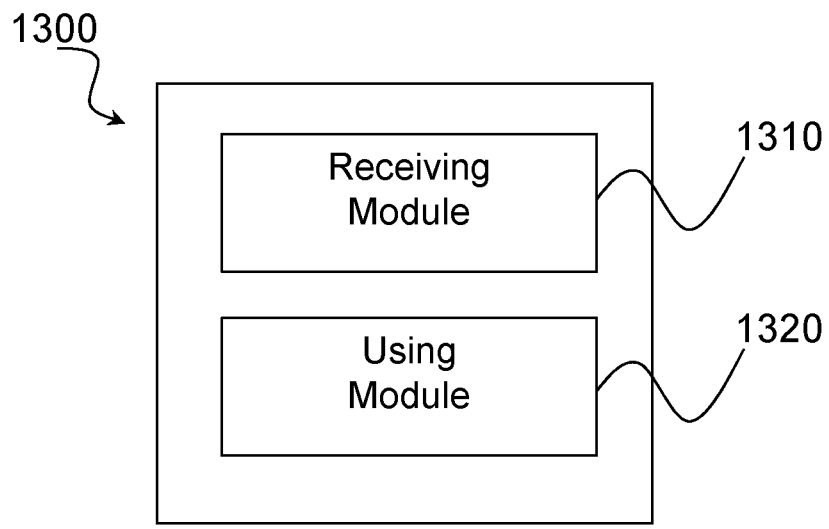
FIG. 13 illustrates another example virtual computing device for resource allocation between network nodes using an overlapping spectrum, according to certain embodiments.

In certain embodiments, the method for resource allocation between network nodes using an overlapping spectrum as described above may be performed by a computer networking virtual apparatus. FIG. 13 illustrates an example virtual computing device 1300 for resource allocation between network nodes using an overlapping spectrum, according to certain embodiments. In certain embodiments, virtual computing device 1300 may include modules for performing steps similar to those described above with regard to the method illustrated and described in FIG. 12. For example, virtual computing device 1300 may include at least one receiving module 1310, a using module 1320, and any other suitable modules for resource allocation between network nodes using an overlapping spectrum. In some embodiments, one or more of the modules may be implemented using processing circuitry 170 of FIG. 6. In certain embodiments, the functions of two or more of the various modules may be combined into a single module.

The receiving module 1310 may perform the receiving functions of virtual computing device 1300. For example, in a particular embodiment, receiving module 1310 may receive, from the first network node, a message including a bit string representing one or more resources of a plurality of resources for use by the second network node.

The using module 1320 may perform the using functions of virtual computing device 1300. For example, in a particular embodiment, using module 1320 may use the one or more resources indicated by the bit string.

Other embodiments of virtual computing device 1300 may include additional components beyond those shown in FIG. 13 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for resource allocation between a first network node having a first radio access technology (RAT) and a second network node having a second RAT, wherein the first RAT and the second RAT use an overlapping spectrum, the method including:
    determining, by the first network node, one or more resources of a plurality of resources, wherein the one or more resources are for use by the second network node, wherein the plurality of resources is represented by a bit string whose length is equal to a total number of Physical Resource blocks (PRBs) in the plurality of resources to be shared by the first network node and the second network node, wherein each bit in the bit string corresponds to a respective one of the PRBs in increasing order of frequency; and
    transmitting, to the second network node, a message including the bit string which further indicates the one or more resources determined from the plurality of resources.

2. A first network node having a first radio access technology (RAT), the first network node comprising:
    processing circuitry operable to:
    determine, by the first network node, one or more resources of a plurality of resources, wherein the one or more resources are for use by a second network node having a second RAT, wherein the plurality of resources is represented by a bit string whose length is equal to a total number of Physical Resource blocks (PRBs) in the plurality of resources to be shared by the first network node and the second network node, and wherein the first RAT and the second RAT use an overlapping spectrum, wherein each bit in the bit string corresponds to a respective one of the PRBs in increasing order of frequency; and transmit, to the second network node, a message including the bit string which further indicates the one or more resources determined from the plurality of resources.

3. The first network node of claim 2, wherein the message is a coordination message.

4. The first network node of claim 2, wherein the plurality of resources corresponds to a resource grid.

5. The first network node of claim 4, wherein each resource in the resource grid is identified by a bit index in the bit string.

6. The first network node of claim 2, wherein each bit, in the bit string, having a value of 0 corresponds to a particular one of the one or more resources available for use by the second network node.

7. The first network node of claim 2, wherein a bit, in the bit string, having a value of 1 corresponds to a resource that is used by the first network node.

8. The first network node of claim 2, wherein the total number of PRBs represents a full space of time or frequency that are shared between the first network node and the second network node.

9. The first network node of claim 8, wherein:
each bit in the bit string having a first value corresponds to a resource that is for use by the second network node, and
each bit in the bit string having a second value corresponds to a resource that is used by the first network node.

10. The first network node of claim 9, wherein the first value is 1 and the second value is 0, the first and second values being given by a bit.

11. The first network node of claim 2, wherein the first RAT is a master RAT and the second RAT is a secondary RAT and the one or more resources are assigned to the first network node prior to transmitting the message to the second network node.

12. The first network node claim 2, wherein the message comprises an agreement time period during which the one or more resources are used by the second RAT.

13. The first network node of claim 2, wherein the message further comprises one or more additional resources that are associated with overlapping control and reference signals (OCRS) signals and are excluded from the one or more resources.

14. The first network node of claim 2, wherein, and wherein the processing circuitry is further operable to:
receive, by the first network node, a request from the second network node, wherein the request indicates a desired amount of resources, and
wherein the message transmitted to the second network node is transmitted in response to the request from the second network node,
wherein the one or more resources determined for use by the second network node includes the desired amount of resources indicated in the request.

15. A method by a first network node for resource allocation between the first network node having a first radio access technology (RAT) and a second network node having a second RAT, wherein the first RAT and the second RAT use an overlapping spectrum, the method including:
receiving, from the second network node, a message including a bit string representing a plurality of resources to be shared by the first network node and the second network node, wherein a length of the bit string is equal to a total number of Physical Resource blocks (PRBs) in the plurality of resources to be shared by the first network node and the second network node, wherein each bit in the bit string corresponds to a respective one of the PRBs in increasing order of frequency; and using one or more resources indicated in the bit string.

16. A first network node having a first radio access technology (RAT), the first network node comprising:
processing circuitry operable to:
receive, from a second network node having a second RAT, a message including a bit string representing a plurality of resources to be shared by the first network node and the second network node, wherein a length of the bit string is equal to a total number of Physical Resource blocks (PRBs) in the plurality of resources to be shared by the first network node and the second network node, wherein the first RAT and the second RAT use an overlapping spectrum, wherein each bit in the bit string corresponds to a respective one of the PRBs in increasing order of frequency; and
use one or more resources indicated in the bit string.

17. The first network node of claim 16, wherein the message is a coordination message.

18. The first network node of claim 16, wherein the plurality of resources corresponds to a resource grid.

19. The first network node of claim 18, wherein each resource in the resource grid is identified by a bit index in the bit string.

20. The first network node of claim 16, wherein each bit, in the bit string, having a value of 0 corresponds to a particular one of the one or more resources available for use by the first network node.

21. The first network node of claim 16, wherein each bit, in the bit string, having a value of 1 corresponds to a resource that is used by the second network node.

22. The first network node of claim 16, wherein the total number of PRBs represents a full space of time or frequency that are shared between the first network node and the second network node.

23. The first network node of claim 22, wherein the message further comprises:
each bit in the bit string having a first value corresponds to a resource that is for use by the first network node, and
each bit in the bit string having a second value corresponds to a resource that is used by the second network node.

24. The first network node of claim 23, wherein the first value is 1 and the second value is 0, the first and second values being given by a bit.

25. The first network node of claim 16, wherein the first RAT is a secondary RAT and the second RAT is a master RAT and the one or more resources are assigned to the second network node prior to receiving the message by the second network node.

26. The first network node of claim 16, wherein the message comprises an agreement time period during which the one or more resources may be used by the second RAT.

27. The first network node of claim 16, wherein the message further comprises one or more additional resources that are associated with overlapping control and reference signals (OCRS) signals and are excluded from the one or more resources.

28. The first network node of claim 16, wherein the processing circuitry is further operable to:
- transmit, by the first network node, a request to the second network node, wherein the request indicates a desired amount of resources; and
- wherein the message received from the second network node is received in response to the request from the first network node,
- wherein the one or more resources indicated for use by the first network node in the message includes the desired amount of resources indicated in the request.

* * * * *